United States Patent [19]
Smith

[11] Patent Number: 5,107,099
[45] Date of Patent: Apr. 21, 1992

[54] MAGNETIC CARD READER AND METHOD

[76] Inventor: Malcolm G. Smith, 150 Timber Ln., Grants Pass, Oreg. 97526

[21] Appl. No.: 342,217

[22] Filed: Apr. 24, 1989

[51] Int. Cl.$^5$ .............................................. G06K 7/08
[52] U.S. Cl. ........................................ 235/449; 360/2
[58] Field of Search ..................... 235/449, 493; 360/2; 428/900

[56] References Cited

U.S. PATENT DOCUMENTS

| | | | |
|---|---|---|---|
| 3,761,687 | 9/1973 | Swett et al. | 235/61 |
| 3,959,623 | 5/1976 | Nakahara | 235/61 |
| 4,084,198 | 4/1978 | Lemelson | 360/33 |
| 4,114,181 | 9/1978 | Itoh | 360/2 |
| 4,197,988 | 4/1980 | Moss et al. | 235/449 |
| 4,209,811 | 6/1980 | Blazevic | 360/2 |
| 4,302,523 | 11/1981 | Audran et al. | 235/493 X |
| 4,403,138 | 9/1983 | Battarel et al. | 235/493 |
| 4,581,523 | 4/1986 | Okuno | 235/449 X |
| 4,592,042 | 5/1986 | Lemelson et al. | 369/258 |
| 4,707,593 | 11/1987 | Murata et al. | 235/493 X |
| 4,731,645 | 3/1988 | Parmentier et al. | 235/380 X |
| 4,774,618 | 9/1988 | Raviv | 360/133 |
| 4,800,551 | 1/1989 | Noris | 369/77 |
| 4,812,632 | 3/1989 | Kakinuma et al. | 235/479 |
| 4,820,913 | 4/1989 | Haddock | 235/487 |

Primary Examiner—David Trafton
Attorney, Agent, or Firm—Townsend and Townsend

[57]. ABSTRACT

Apparatus and method wherein a credit card sized memory card having a magnetic storage medium thereon can be inserted into an operative position adjacent to a read/write head, and the card and head can be moved relative to each other to permit the head to read data from or to write data on the magnetic medium of the memory card. In a first embodiment, a disk form is provided like a hard disk but with a cut out portion or opening therein into which the memory card is insertable. The disk form can then be rotated so that the magnetic medium on the card can be moved past the read/write head movable radially of the central axis of the disk form. In another embodiment the memory card is movable into a fixed operative position adjacent to a read/write head and the head is movable radially as well as circumferentially arc so that the head and memory card are movable relative to each other in two degrees of freedom.

20 Claims, 7 Drawing Sheets

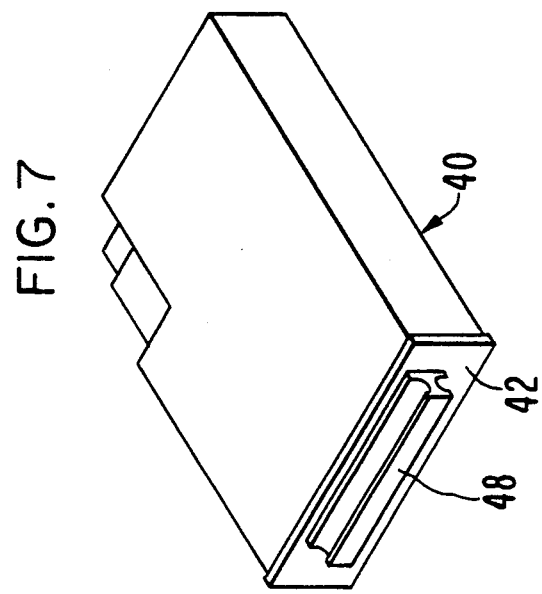
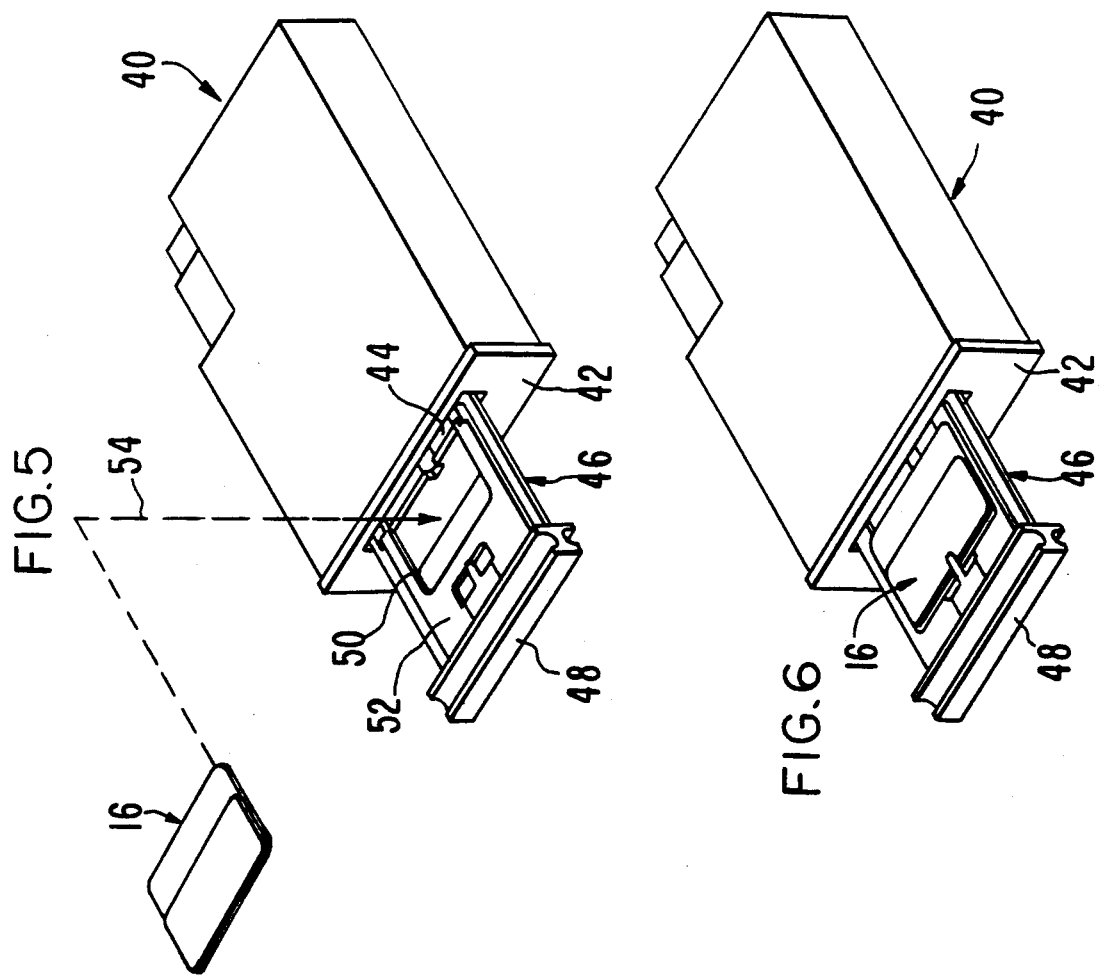

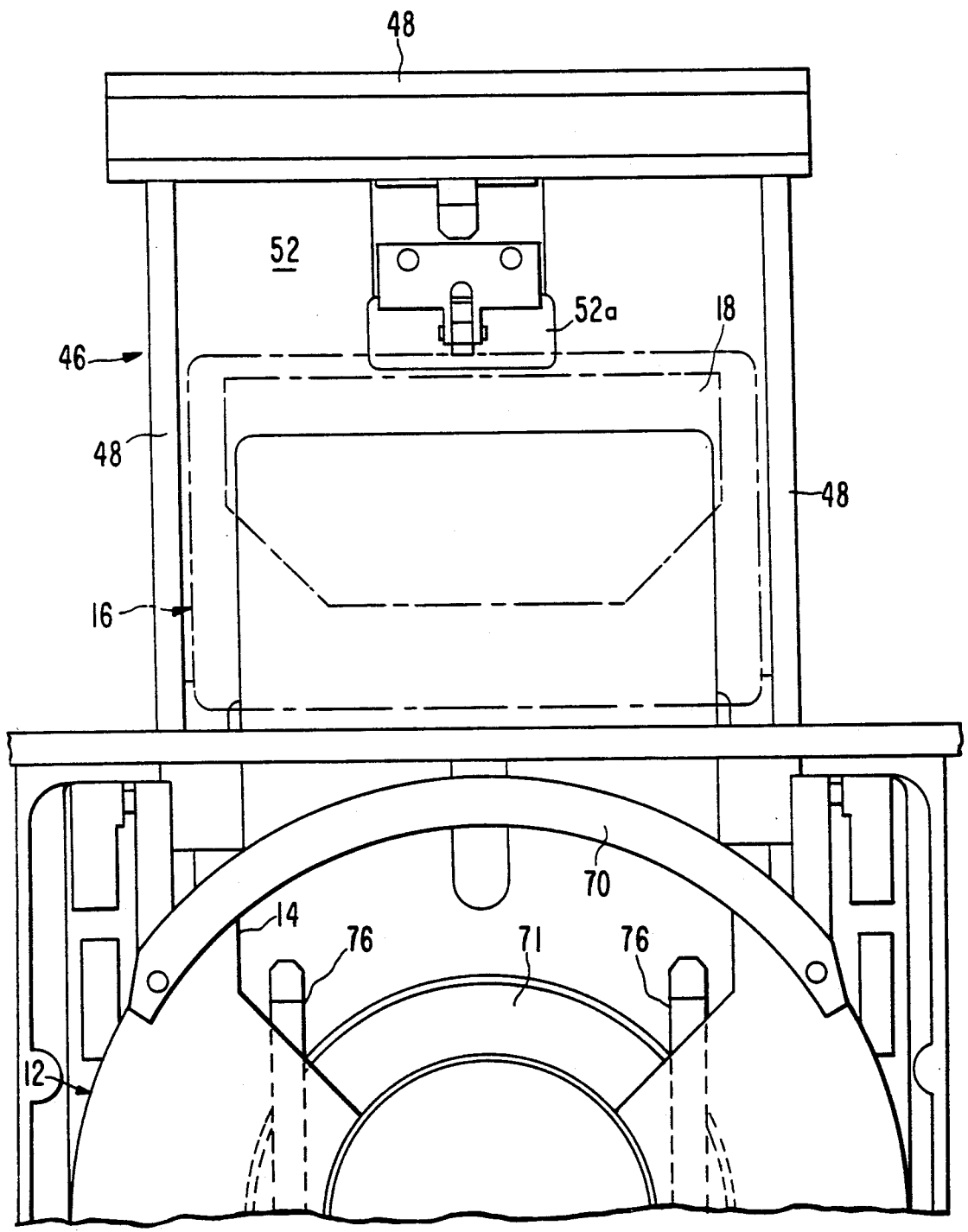

MAGNETIC CARD READER AND METHOD

FIELD OF THE INVENTION

This invention relates to improvements in magnetic recording systems using rotatable disks and, more particularly, to apparatus and a method for recording and/or playing back digital data using a data storage device having the dimensions of a credit card.

BACKGROUND OF THE INVENTION

Magnetic storage systems using rigid magnetic storage disks rotatable about a central axis have been known and used in the past. Also, magnetic strips have been used on credit card-sized memory devices for storing data and for reading the data when such a device is passed through a machine capable of reading data from and writing data onto the magnetic strip of the card. For the most part, read/write machines have certain drawbacks, one of which is lack of simplicity and proper registration of the card with respect to the magnetic head that reads data from the card or writes data onto the card. Because of these drawbacks, a need has arisen for an improved system for storing data on a magnetic medium having the size of a conventional credit card to allow the credit card to be carried from place to place and be quite versatile in use with a data storage and read out machine. The present invention satisfies this need by providing apparatus and method for reading data from and writing data onto the magnetic storage medium of such a card.

SUMMARY OF THE INVENTION

The present invention is directed to apparatus and method of the type described wherein a system is provided in which a credit card sized memory card having a magnetic storage medium thereon can be inserted into an operative position adjacent to a read/write head, and the card and head can be moved relative to each other to permit the head to read data from or to write data on the magnetic medium of the memory card yet the memory card can be removed from the operative position thereof and carried in a wallet or the like.

In a first embodiment of the apparatus of the present invention, a disk drive system is provided which a disk form is used like a hard disk but with a cut out portion or opening therein into which the memory card is insertable. After the card is inserted into the opening of the disk form, the disk form is rotated so that the magnetic medium on the card can be moved past a read/write head which operates in the normal fashion and is movable radially of the central axis of the disk form under the influence of a positioning stepper motor coupled to a carriage which, in turn, is coupled by an arm to the head.

In another embodiment of the invention, the memory card is movable into a fixed operative position adjacent to a read/write head and the head is movable radially as well as circumferentially through a limited arc so that the head and memory card are movable relative to each other in two degrees of freedom. The head can read data from the magnetic storage medium on the card or write data onto such magnetic medium so as to provide magnetic storage and playback of digital data using the memory card.

A main object of the present invention is to provide an apparatus and a method for magnetic storage and playback of data signals stored on a magnetic storage medium attached to a card having the dimensions similar to that of a conventional credit card wherein the apparatus and method is simple and rugged in construction, is inexpensive to produce and maintain, and permits the card to be readily inserted into and taken out of the apparatus while ensuring proper registry of the magnetic storage medium of the card with respect to a read/write head forming part of the apparatus.

Other objects of this invention will become apparent as the following specification progresses, reference being had to the accompanying drawings for an illustration of several embodiments of the invention.

IN THE DRAWINGS

FIGS. 5, 6 and 7 are sequential views showing the way in which a memory card is inserted into a housing containing the elements of FIG. 1 or the elements of FIG. 2;

FIG. 8A is a view similar to FIG. 8 but showing only a portion of the disk drive system and illustrating the memory card in a position in a tray about to be directed into the opening or pocket of the disk form;

DETAILED DESCRIPTION OF THE DRAWINGS

Figure 1:
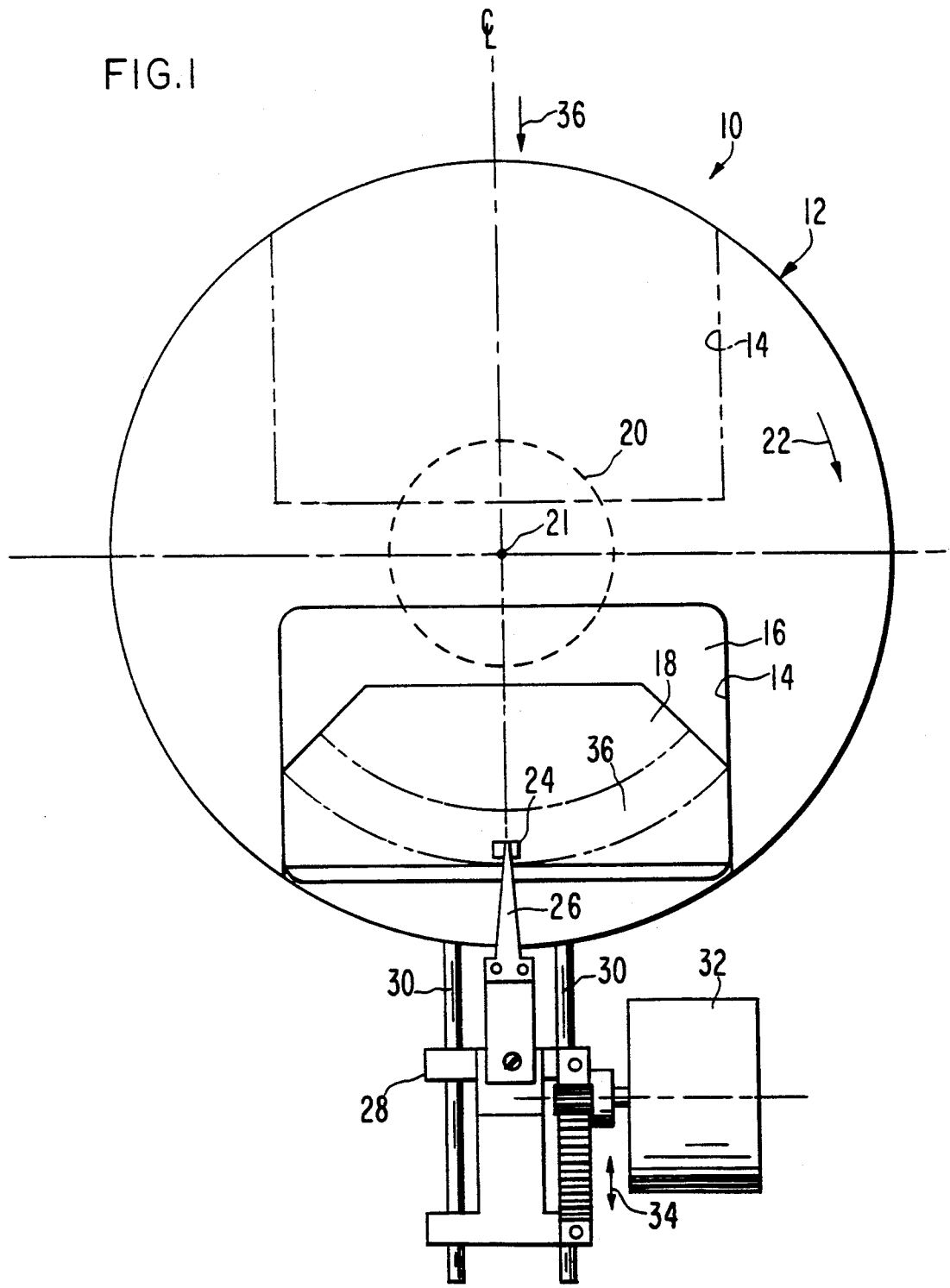
FIG. 1 is a top plan view in schematic form of a disk drive system having a magnetic memory card insertable in a slot or opening in a disk form and in a position to be rotated with the disk form past a read/write transducer or head.

A first embodiment of the disk drive memory apparatus of the present invention is broadly denoted by the numeral 10 and is illustrated schematically in FIG. 1. Apparatus 10 includes a disk form 12 having a cut-out portion or opening 14 to present a space for receiving a memory card 16 having a magnetizable layer 18 on which data can be magnetically recorded. Layer 18 is relatively thin, such as 0.015", and it can be an aluminum plate or strip which has been plated with nickel-cobalt or a material with equivalent magnetic properties as found on a record strip on a plastic credit card of conventional construction. The plating on the layer 18 can be protected with a sputtered carbon overcoat and a suitable head lubricant applied such as in the manner known in hard disk technology of conventional construction.

The disk form 12 has a spindle motor 20, such as a brushless D.C. motor, below the disk form 12 for rotating the disk form in a circumferential direction, such as the direction indicated by arrow 22 (FIG. 1), so that, as the disk form rotates relative to a fixed reference, memory card 16 rotates with the disk form 12 past a read/write head 24 mounted on the outer end of an arm 26 coupled to a head carriage 28 mounted on tracks 30 for movement radially of the central axis 21 of the disk form. A stepper motor 32 is coupled to head carriage 28 for moving the carriage back and forth as indicated by arrows 34 when motor 32 receives control signals from a control means (not shown). Head 24 can move radially along the upper surface of layer 18 to read data on the layer 18 or to record data on the layer 18. A suitable conductor lead (not shown) can be coupled with head 24 to supply data signals to the head from the control means or to direct data signals from the head to a control location. As the disk form 12 rotates under the influence of motor 20, it rotates card 16 past head 24 and the head can read data from the layer 18 or write data onto layer 18.

Figure 3:
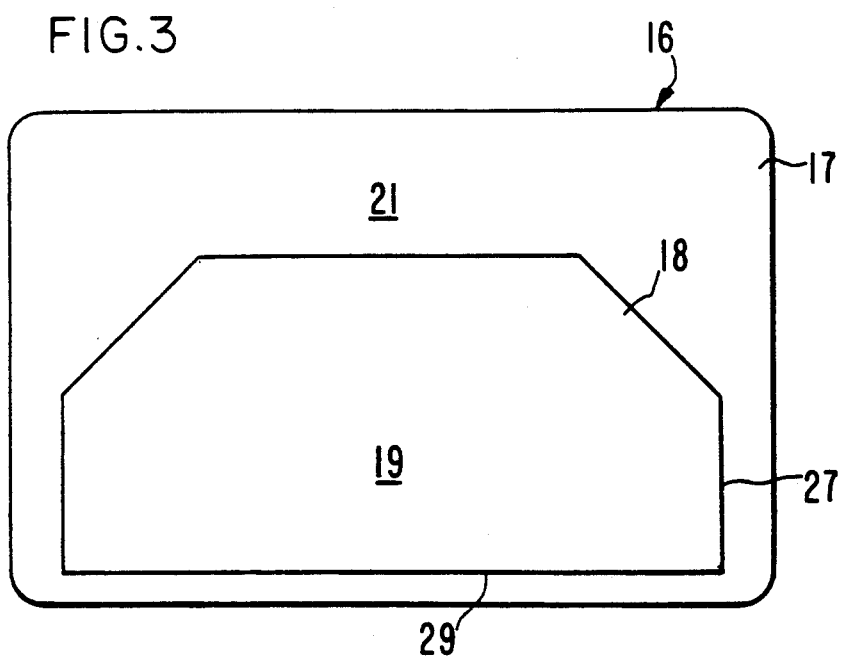
FIG. 3 is a top plan view of the magnetic memory card showing a magnetizable portion on a base portion.
Figure 4:
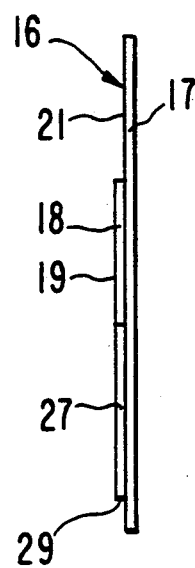
FIG. 4 is an end elevational view of the memory card of FIG. 3.

FIG. 3 shows an enlarged view of memory card 16 and illustrates the plastic generally rectangular base 17 thereof on which layer 18 is attached, such as by an adhesive. The layer has magnetic recording and playback capabilities and represents about ¼ the circumference of the disk form 12 with which the card 16 is used. FIG. 4 shows that layer 18 is provided with an outer or upper surface 19 which is spaced from and parallel to the plane 21 of the upper surface base 17.

Typically, space 17 is of the size and shape of a conventional credit card so that the card 16 can be placed in a wallet or other confined space of small size. Layer 18 has a pair of angled edge margins 23 converging toward each other as a transverse edge margin 25 is approached. A pair of parallel edge margins 27 extend between the adjacent ends of margins 23 and an outer transverse edge margin 29. Margins 23 and 27 mate with corresponding edge margins on disk form 12 which define the adjacent boundaries of opening 14 of disk form 12, as shown in FIG. 1.

FIGS. 5, 6 and 7 show the sequence of inserting memory card 16 into coupled relationship with disk form 12 (FIG. 1). The disk form, the head 24, carriage 28 and motor 32 are contained within a housing 40 which can be of any size and shape so long as it accommodates all of the foregoing elements. Housing 40 includes a front wall 42 provided with a slot 44 therethrough which receives a tray 46 having rails 41 slidable on guides 43 (FIG. 8B) within the housing. The tray has a handle 48 on the outer end thereof which can be grasped and pulled outwardly to expose a card-receiving space 50 in the base plate 52 of the tray.

When card 16 is hand-held, it can be moved along the dashed line path 54 of FIG. 5 and into space 50 where the card is supported by base plate 52 of tray 46 (FIG. 6). Then, handle 48 is moved toward slot 44 until the handle engages the outer surface of front wall 42. When this occurs, the card is in its operative position indicated in FIG. 1, and spindle motor 20 can be actuated to rotate disk form 12 relative to head 24. The head can then supply data signals to layer 18 or data signals can be read by head 24 from layer 18. A flange 51 mounts motor 20 on a support in housing 40.

A more detailed view of apparatus 10 is shown in FIGS. 8, 8A, 8B and 9 and illustrates disk form 12 between the side walls 41 of housing 40. Read/write head 24 and arm 26 are shown coupled to carriage 28 mounted on spaced, fixed, parallel tracks 30 adjacent to a rear wall 43 of housing 40. A flexible conductor lead 45 is coupled to head 24 and to a control means 47 so that data signals can be written on the layer 18 of card 16 as disk form 12 rotates or head 24 can sense data signals, previously recorded layer 18, as disk form 12 rotates relative to head 24. Operation of radial carriage position motor 32 rotates a shaft 33 on which a cylindrical member 35 is mounted and coupled to a flexible band 37 for moving carriage 28 back and forth as the motor 32 is actuated.

Figure 8:
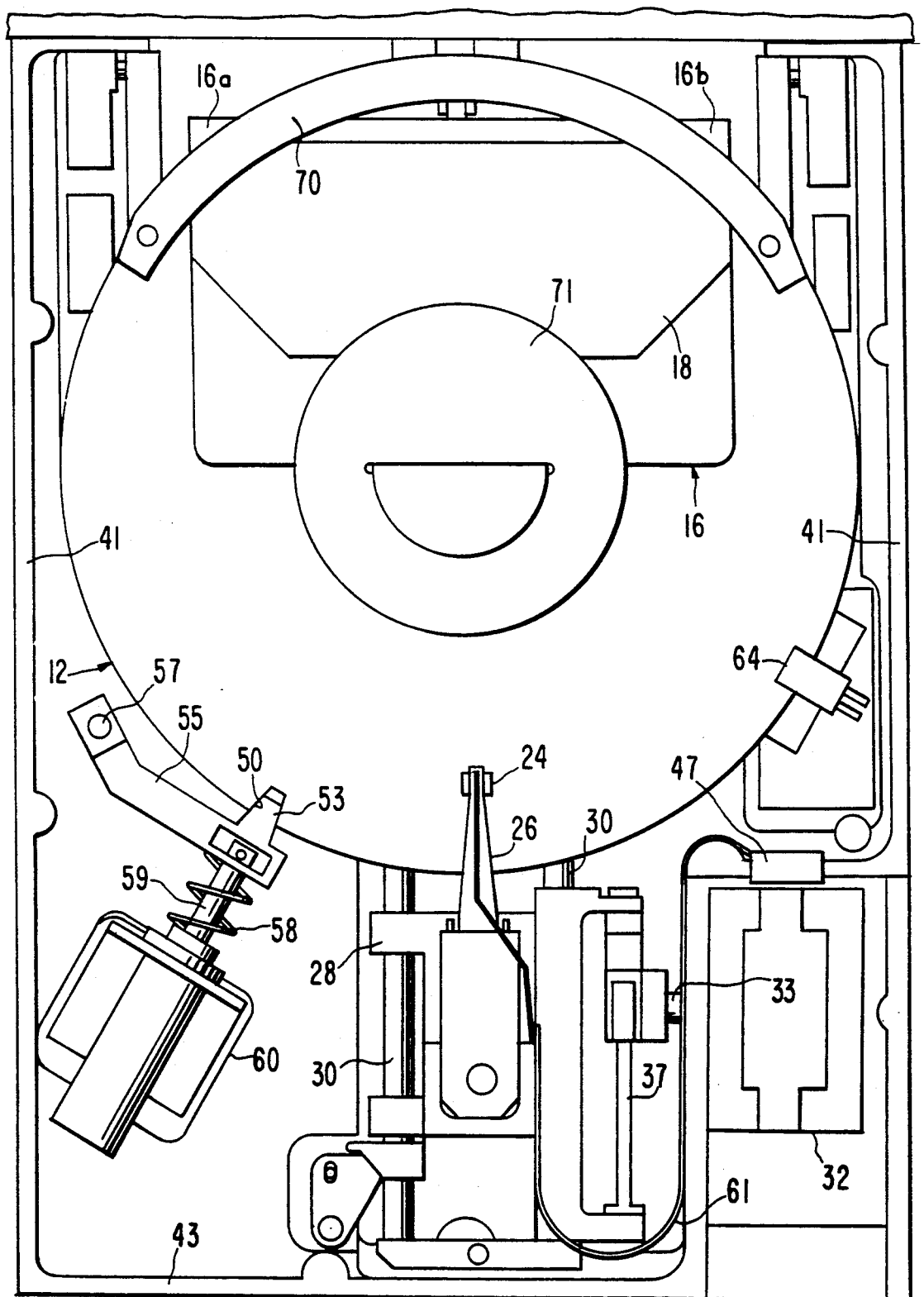
FIG. 8 is a top plan view of a more specific embodiment of the disk drive system of FIG. 1 and showing the memory card in the opening or pocket of a disk form.

FIG. 8 shows the memory card 16 in its operative position in the disk form. In such a position, the upper surface of layer 18 is substantially coextensive with the upper surface of the disk form. Thus, the disk form may or may not be provided with a magnetic coating for recording and playback of data signals. A coating will permit the disk form to receive recorded data thereon or to permit playback of data from the disk form. In effect, therefore, the plane of the upper surface of layer 18 is the same plane as the upper surface of disk form 12 when memory card 16 is in the operative position as shown in FIG. 8.

Figure 8B:
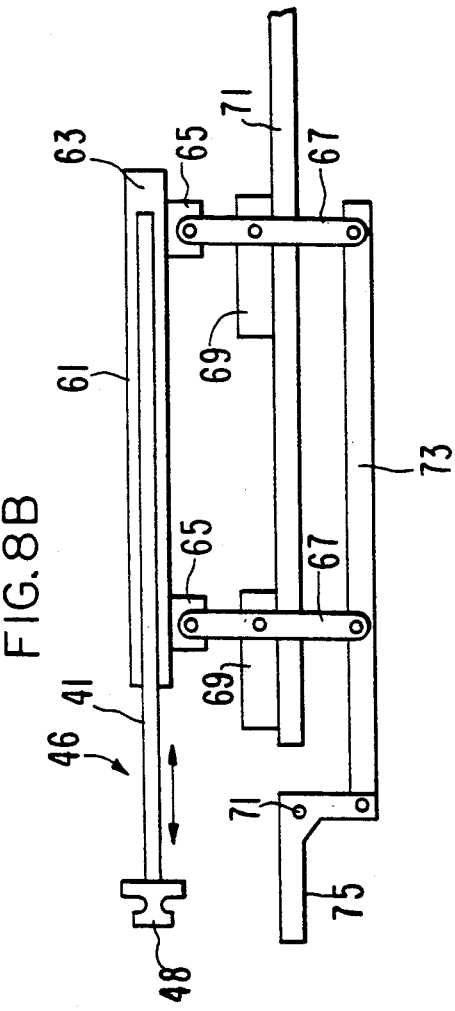
FIG. 8B is a schematic view of the way in which the tray is movable to insert and remove a memory card from the opening or pocket of the disk form.

FIG. 8A shows the memory card 16 in tray 46 with the tray being out of the housing 40 and away from disk form 12. FIG. 8B shows schematically the way in which tray 46 is inserted into the opening 14 in the disk form 12. The tray has rails 41 on the opposed sides thereof, the rails being received in grooves in respective guides 61 (FIG. 8B) which are in housing 40 and have respective stops 63 for limiting the inward movement of tray 46.

Each guide 61 has a pair of ears 65 to which a link 67 is coupled, there being a pair of links on each side, respectively, of each guide 61. Each link 67 is pivotally mounted intermediate its ends by a pin to a pivot block 69 mounted in a fixed position on a web 75 forming a part of the support of housing 40. The links 67 are pivoted at their lower ends to a Y-shaped draw bar 73 which is coupled pivotally at one end to a latch lever 75 carried in some suitable manner on housing 40, such as by front wall 42. Latch lever 75 is pivotally mounted by a pin 77 to web 71.

Figure 10:
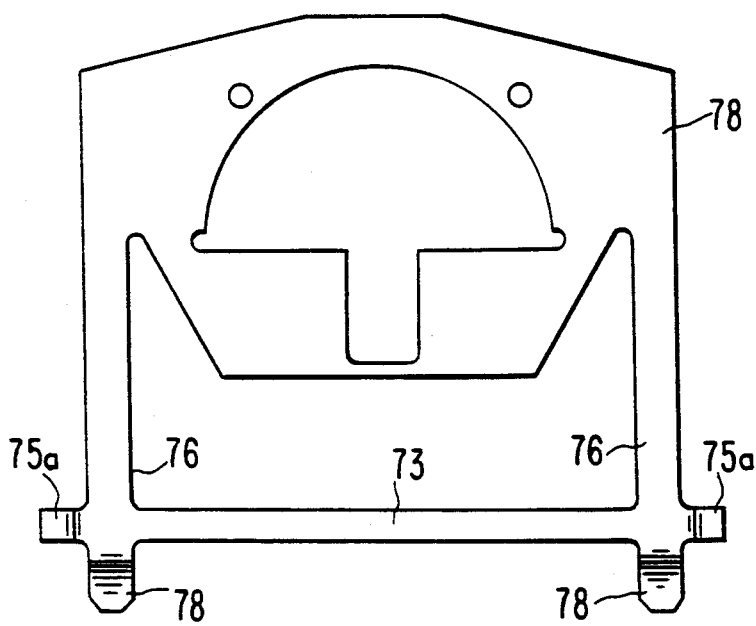
FIG. 10 is a spring plate forming a part of the assembly of FIGS. 8 and 9.
Figure 11:
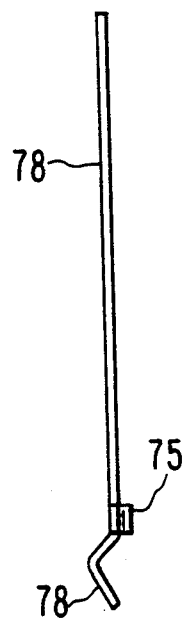
FIG. 11 is a side elevational view of the spring plate of FIG. 10.
Figure 12:
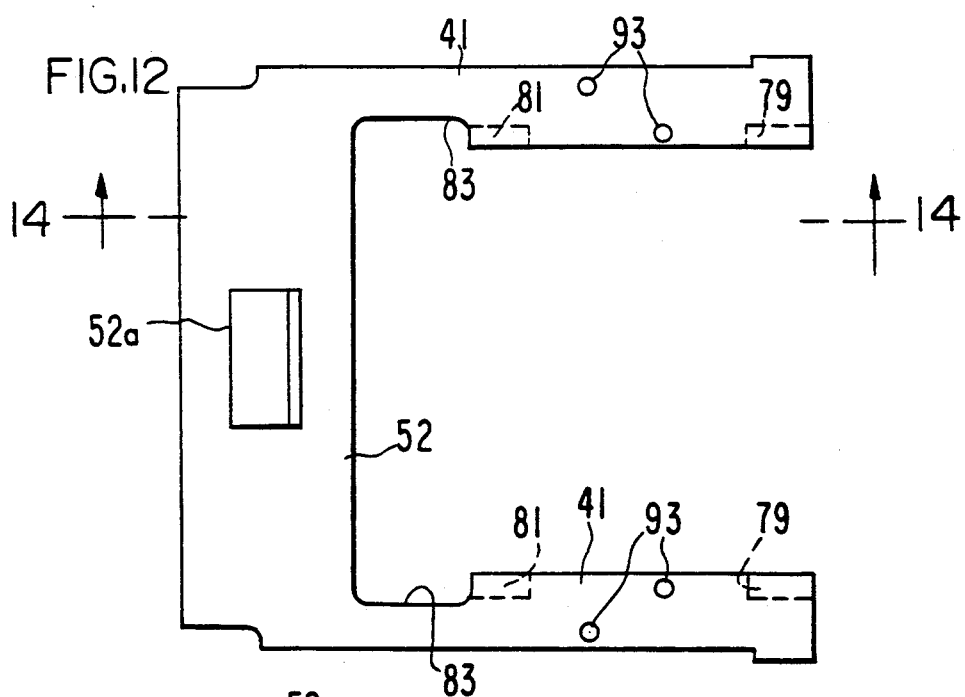
FIG. 12 is a top plan view of the shiftable tray for moving a memory card into a housing of the type shown in FIGS. 5-7.

Rails 41 of tray plate 52 have first cam surfaces 79 which engage cam ears 75a on spring fingers 76 of a spring plate 78 (FIG. 10 and 11). The spring fingers 76 are below pocket or opening 14 of disk form 12, and the cam surfaces 79 force the spring plates downwardly, allowing card 16 to move into the space 14 above the spring finger as tray plate 52 is moved to the right when viewing FIG. 8B. A card pusher block 52a is on plate 52 (FIG. 12).

Tray 46 continues to move to the right relative to guides 61 until rails 41 engage stops 63, at which time latch lever 75 is manually pressed inwardly to rotate latch lever 75 in a clockwise sense about pin 77 to move draw bar 73 to the left when viewing FIG. 8B to thereby pivot bars 67 in a clockwise sense when viewing FIG. 8B causing guide 61 and tray 46 held thereby downwardly and out of the way of the rotatable disk form so that the disk form will not strike nor engage the guides or the tray when the card is in its operative position in opening 14 of disk form 12.

Figure 13:
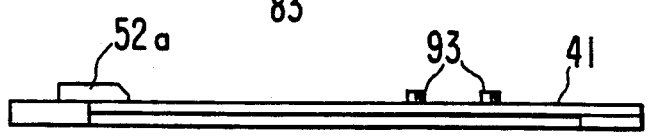
FIG. 13 is a side elevational view of the tray of FIG. 12.
Figure 14:
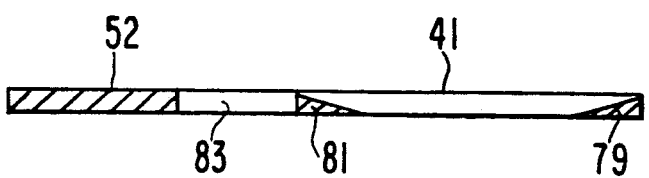
FIG. 14 is a vertical section through one side of the tray of FIGS. 12 and 13.

As the guide 61 rotates under the influence of bar 67 to the right when viewing FIG. 8B, the bottom surface of rails 41 slides past the ears 75a near the outer ends of spring fingers 76 until the ears 75a engage a second pair of cam surfaces 81 (FIG. 12, 13 and 14), at which time an opening 83 in each rail 41 allows the respective ears 75a and thereby spring finger end to move upwardly, clamping the card in place in pocket or opening 14 of disk form 12. The disk form can then be rotated under the influence of spindle motor 20 to in turn rotate disk card 16 with the disk form 12.

Disk form 12 is provided with a radial notch 50 in the outer periphery thereof for receiving a projection 52 on the outer end of an arm 54 pivotally mounted by a pin 56 on a support in housing 40. Arm 54 is coupled to the plunger 58 of a solenoid 60 secured in a suitable manner to a support in housing 40. A coil spring 59 biases plunger 58 toward projection 52.

Notch 50 and projection 52 are used when it is desired to orient disk form 12 in a position to receive or remove card 16 from the operative position shown in FIG. 8. With projection 52 in notch 50, the disk form is correctly positioned to receive the card 16 in space or opening 14 cut out in the disk form. When it is desired to rotate disk form 12 with card 16 attached thereto, projection 52 is retracted from notch 50 by sending a signal to solenoid 60 from a suitable control means (not shown). The signal is applied to solenoid 60, keeping the projection 52 out of notch 50. When it is desired to remove card 16 from space 14 of disk form 12, the signal is removed from solenoid 60, causing spring 59 to bias projection 52 toward the central axis of disk form 12 and the next pass of notch 50 past projection 52 allows the spring 59 to bias the projection in the notch 50.

An optical sensor 64 having a throat adjacent to the outer periphery of disk form 12 is positioned to sense the location of notch 50 relative to projection 52 and to energize or de-energize the solenoid, whichever the case may be, so that projection 52 will enter notch 50 at the proper time.

Disk form 12 has an arcuate card retaining member 70 (FIG. 8) which is coupled by pins 72 to disk form 12 near the space 14 thereof. Member 70 provides a continuation of the out periphery of the disk form and spans the open end of the disk form created by the removal of the material in the disk form which is in the shape of a card 16. Retaining member 70 is mounted on the upper surface of the disk form and has a flat lower surface to provide a pair of vertical reference surfaces for the respective adjacent corners 16a and 16b of card 16 as shown in FIG. 8 when the card is in the space 14 of disk form 12.

Figure 9:
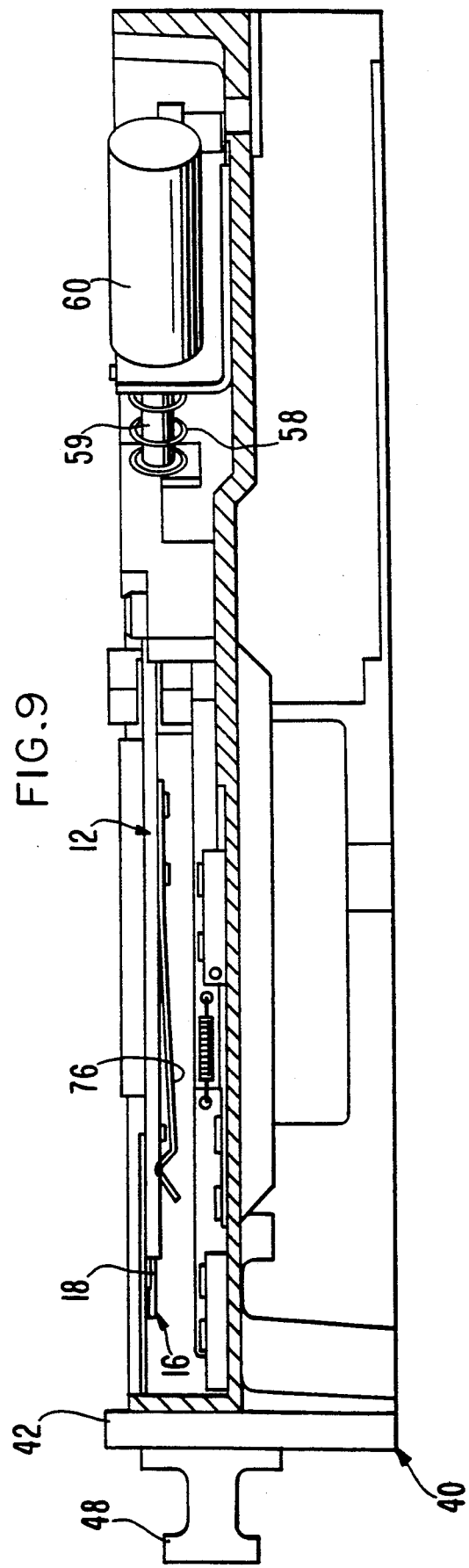
FIG. 9 is a vertical section through the assembly of FIG. 8.

Card 16 is inserted from the underside of member 70 and disk form 12 and is raised into contact with the vertical reference surfaces provided by the bottom surfaces of retaining member 70 and the flat bottom surface of a clamp plate 71 for a disk form 12 as shown in FIG. 8. The card 16 is raised by means of spring fingers 76 of spring plate 78 secured to the underside of spring form 12 and rotatable therewith. FIGS. 10 and 11 illustrate that the spring plate fingers 76 are parallel with each other, are interconnected by a bar 73 and are spaced apart at a distance shown in FIG. 10. Each spring finger 76 has an angled entrance end 78 to allow a rail 41 to first engage angled ends 78 to force spring fingers 76 downward to allow insertion of the card 16 into its operative position with respect to disk form 12. Only one of the arms 76 is shown in FIG. 9.

Head 24 is modified to eliminate its propensity for "flying" in the laminar air film created when the disk is rotating at high speed. All read/write operations are accomplished with the head 24 in contact with the upper surface of the disk form 12 and the upper surface of media layers 18.

Registration of media layer 18 during operation is accomplished by centrifugal force moving the media into registration with the ledges on the retaining member 70 in radial acceleration forcing media layer 18 against an edge of the disk form space 14. An auxiliary mechanism, identified as a card depressor, can be used to ensure that the card 16 is entered into and/or extracted from the card form opening 14 without contacting the reference ledges on retaining member 70. A unique brake control circuit (not shown) can be used to sense the motor speed and to time the release of the brake arm 54. The circuit also senses brake engagement failure and will nudge the spindle motor until the brake engages.

A second embodiment of the apparatus of the present invention is broadly denoted by the numeral 100 and is adapted to be used with a memory card 102 having a layer 104 of magnetizable material. Card 102 is generally identical in all respects to card 16 used in apparatus 10 as described above.

Apparatus 100 has means (not shown) for inserting the card 102 into operative position. Such means could be a tray and structure defining an opening 14 as described with respect to apparatus 10.

A read/write head 106 is mounted on the end of an arm 108 carried by a carriage 110 on a pair of spaced, parallel tracks 112. Carriage 110 has two degrees of freedom, namely a straight line movement radially of a central axis 114 aligned with the arm 108 and circumferential movement about the axis 114 through a limited arc of travel, such as in a range of approximately 20° to 40° depending upon the size of the card 102 and the size of the magnetizable layer 104 of the card 102.

Tracks 112 are part of a support which is pivotally mounted by the means of a pin 116 defining axis 114. A first stepper motor operates to move carriage 110 radially along tracks 112 so that head 106 can be moved radially with respect to central axis 114. A second stepper motor 120 is provided for rotating support 117 about the central axis 114 to thereby drive a head 106 circumferentially.

Figure 2:
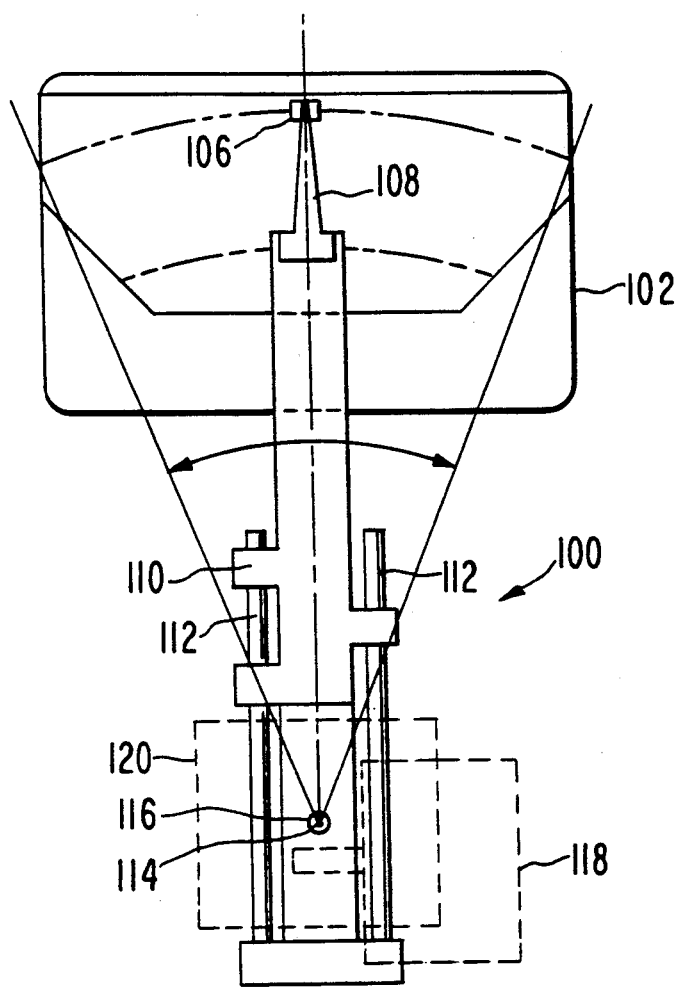
FIG. 2 is a view similar to FIG. 1 but showing a fixed memory card insertable into a position adjacent to a read/write head which is movable radially and circumferentially.

In use, with card 102 in place as shown in FIG. 2, one or both motors 118 and 120 can be operated to move head 106 past the upper surface of layer 104 to read data from the layer or to write data onto the layer. Changes in the position of the head can be effected by changing the signals applied to the motors 118 and 120.

I claim:

1. Magnetic storage and readout apparatus for use with a card having a magnetic medium therein comprising:

a support, a disk form rotatably mounted on the support and having means thereon for forming an opening for mounting the card in an operative position with respect to the support, said opening extending into the disk form from the outer periphery thereof, said card being insertable into the opening through said outer periphery;

means coupled with the disk form for rotating disk form about the central axis thereof;

a magnetic read/write head;

means mounting the head on the support for movement of the head relative to the disk form; and means coupled with the head for moving the same relative to the disk form, whereby the head and the magnetic medium on the card can move relative to each other so that the head can read data from the magnetic storage medium or write data onto the magnetic storage medium when the card is in said operative position thereof and as said disk form is rotated.

2. Apparatus as set forth in claim 1, wherein said disk form has a spindle motor thereon for rotating the disk form past the head, whereby the magnetic medium on the card can move in data transfer relationship between the card and the head as the card is in said opening in a disk form.

3. Apparatus as set forth in claim 1, wherein said head mounting means includes a carriage and tracks for mounting the carriage for movement relative to the disk to thereby move the head radially of the central axis of the disk form, and a stepper motor coupled with the carriage for moving the same toward and away from the outer periphery of the disk.

4. Apparatus as set forth in claim 1, wherein said disk form has means thereon for defining a reference surface engageable with the card when the card is in said operative position.

5. Apparatus as set forth in claim 4, wherein said reference defining means includes a curved retainer member near the outer periphery of the disk form across said opening thereof, said retainer member having a pair of reference surface portions engageable with the card when the card is in said operative position.

6. Apparatus as set forth in claim 1, wherein is included a housing, said disk form being rotatably mounted in the housing, said housing having a tray for receiving said card, said tray being movable into the housing to move the card into said operative position.

7. Apparatus as set forth in claim 6, wherein said tray has a base plate provided with an opening therein for receiving the card for positioning the card for movement into the housing and into said operative position when the tray moves into the housing, said tray being operable to remove the card from the housing when the tray is pulled out of the housing.

8. A magnetic storage and readout method for use with a card having a magnetic medium thereon comprising:

providing an opening in a support for mounting the card in an operative position with respect to the support with the opening extending into the support from the outer periphery of the support;

moving the card past said outer periphery to mount the card in said opening adjacent to a read/write head; and moving the head relative to the card to permit data to be read from the magnetic storage medium and to write data onto the magnetic storage medium when the card is in said operative position thereof and adjacent to the head.

9. A magnetic storage and readout method for use with a card having a magnetic medium thereon comprising:

providing a support having an opening therethrough;

moving the card beneath the support and into the opening to mount the card in an operative position;

rotating the card about a central axis spaced from the operative position; and moving a read/write head in data transfer relationship to the magnetic medium of the card as the card rotates about said central axis.

10. Magnetic storage and readout apparatus for use with a card having a magnetic medium therein comprising:

a support;

a disk form rotatably mounted on the support and having means thereon for forming an opening for mounting the card in an operative position with respect to the support;

means for defining a spring finger carried by the disk form for rotation therewith, said spring finger being biased in a direction to force the card into said opening of the disk.

means coupled with the disk form for rotating the disk form about the central axis thereof;

a magnetic read/write head;

means mounting the head on the support for movement of the head relative to the disk form; and means coupled with the head for moving the same relative to the disk form, whereby the head and the magnetic medium on the card can move relative to each other so that the head can read data from the magnetic storage medium or write data onto the magnetic storage medium when the card is in said operative position thereof and as said disk form is rotated.

11. Apparatus as set forth in claim 10, wherein said disk form has a spindle motor thereon for rotating the disk form past the head, whereby the magnetic medium on the card can move in data transfer relationship between the card and thee head as the card is in said opening in a disk form.

12. Apparatus as set forth in claim 10, wherein said head mounting means includes a carriage and tracks for mounting the carriage for movement relative to the disk to thereby move the head radially of the central axis of the disk form, and a stepper motor coupled with the carriage for moving the same toward and away from the outer periphery of the disk.

13. Apparatus as set forth in claim 10, wherein said disk form has means thereon for defining a reference surface engageable with the card when the card is in said operative position.

14. Apparatus as set forth in claim 13, wherein said reference defining means includes a curved retainer member near the outer periphery of the disk form across said opening thereof, said retainer member having a pair of reference surface portions engageable with the card when the card is in said operative position.

15. Apparatus as set forth in claim 10, wherein is included a housing, said disk form being rotatably mounted in the housing, said housing having a tray for receiving said card, said tray being movable into the housing to move the card into said operative position.

16. Apparatus as set forth in claim 15, wherein said tray as a base plate provided with an opening therein for receiving the card for positioning the card for movement into the housing and into said operative position when the tray moves into the housing, said tray being operable to remove the card from the housing when the tray is pulled out of the housing.

17. Magnetic storage and readout apparatus for use with a card having a magnetic medium therein comprising:
- a support;
- a disk form rotatably mounted on the support and having means thereon for forming an opening for mounting the card in an operative position with respect to the support;
- a pair of spaced, parallel spring fingers secured to the disk form for rotation therewith, said spring fingers being aligned with the opening of the disk form and being biased in a direction to force the card into said opening in the disk form so that the upper surface of the magnetic medium forms an extension of the upper surface of the disk form;
- means coupled with the disk form for rotating the disk form about the central axis thereof;
- a magnetic read/write head;
- means mounted the head on the support for movement of the head relative to the disk form; and
- means coupled with the head for moving the same relative to the disk form, whereby the head and the magnetic medium on the card can move relative to each other so that the head can read data from the magnetic storage medium or write data onto the magnetic storage medium when the card is in said operative position thereof and as said disk from is rotated.

18. Magnetic storage and readout apparatus for use with a card having a magnetic medium therein comprising:
- a support;
- a disk form rotatably mounted on the support and having means thereon for forming an opening for mounting the card in an operative position with respect to the support, said disk form having means thereon for defining a reference surface engageably with the card when the card is in said operative position, said reference defining means including a curved retainer member near the outer periphery of the disk form across said opening thereof, said retainer member having a pair of reference surface portions engageable with the card when the card is in said operative position;
- means coupled with the disk form for rotating the disk form about the central axis thereof;
- a magnetic read/write head;
- means mounted the head on the support for movement of the head relative to the disk form; and
- means coupled with the head for moving the same relative to the disk form, whereby the head and the magnetic medium on the card can move relative to each other so that the head can read data from the magnetic storage medium or write data onto the magnetic storage medium when the card is in said operative position thereof and as said disk form in rotated.

19. Magnetic storage and readout apparatus for use with a card having a magnetic medium therein comprising:
- a support;
- means on the support for forming an opening for mounting the card in an operative position with respect to the support;
- a magnetic read/write head adjacent to said operative position, said forming means for the card being operable to mount the card in a fixed position relative to the support, said head being movable radially and circumferentially past the magnetic storage medium of the card when the card is in the fixed position, said mounting means for the head including a carriage, means mounting the carriage for rectilinear movement with the head being movable past the storage medium on the card when the card is in said operative position, said carriage being pivotally mounted for rotation about a central axis spaced from the operative position of the card, means coupled with the carriage for moving the same along said rectilinear path, and means coupled with the carriage for rotating the same about said central axis, whereby the head can move in two degrees of freedom with respect to the magnetic storage medium on the card when the card is in said operative position; and
- means coupled with the card mounting means and the head for moving the head radially and circumferentially relative to the card, whereby the head can read data from the magnetic storage medium or write data onto the magnetic storage medium when the card is in said operative position thereof and adjacent to the head.

20. Apparatus as set forth in claim 19, wherein said means for moving the carriage along said rectilinear path includes a first stepper motor, and the means for pivoting the carriage about said central axis includes a second stepper motor.

* * * * *